United States Patent [19]

Holmes et al.

[11] Patent Number: 4,781,743
[45] Date of Patent: Nov. 1, 1988

[54] METHOD OF IMPROVING WAVEGUIDE UNIFORMITY IN OPTICAL SUBSTRATE AND PRODUCT

[75] Inventors: Ronald J. Holmes, Lowhill Township, Lehigh County; William J. Minford, Lehigh Township, Northampton County, both of Pa.

[73] Assignee: American Telephone and Telegraph Company AT&T Bell Laboratories, Murray Hill, N.J.

[21] Appl. No.: 4,014

[22] Filed: Jan. 16, 1987

[51] Int. Cl.$^4$ .................. C03B 25/00; G02B 5/14; C03C 21/00

[52] U.S. Cl. .................. 65/30.13; 65/3.11; 65/60.53; 65/117; 350/96.12; 350/96.34; 427/164

[58] Field of Search .................. 65/30.13, 60.5, 60.53, 65/117, 3.11; 427/164; 350/96.34, 96.12

[56] References Cited

U.S. PATENT DOCUMENTS

| | | | |
|---|---|---|---|
| 3,486,963 | 12/1969 | Smith | 65/117 X |
| 3,665,205 | 5/1972 | Bridenbaugh et al. | 307/88.3 |
| 4,196,963 | 4/1980 | Chen et al. | 350/96.12 |
| 4,206,251 | 6/1980 | Chen | 427/110 |
| 4,284,663 | 8/1981 | Carruthers et al. | 427/164 |
| 4,312,660 | 1/1982 | Blair et al. | 65/117 X |
| 4,329,016 | 5/1982 | Chen | 350/96.12 |
| 4,370,158 | 1/1983 | Schulke | 65/117 X |
| 4,375,312 | 3/1983 | Tangonan | 350/96.12 |

OTHER PUBLICATIONS

"Nonstoichiometry and Crystal Growth ...", Journal of Applied Physics, vol. 42, No. 5, Apr. 1971, Carruthers et al., pp. 1846-1851.
"Diffusion Kinetics and Optical Waveguiding ...", Applied Optics, vol. 13, No. 10, Oct. 1974, Carruthers et al., pp. 2333-2342.
"Titanium Diffusion into LiNbO$_3$...", J. Appl. Physics, vol. 55, No. 10, May 1984, Holmes et al., pp. 3531-3535.

Primary Examiner—Robert L. Lindsay
Attorney, Agent, or Firm—Wendy W. Koba

[57] ABSTRACT

A method of improving device performance of optical devices formed in optical substrates is disclosed. The method requires that the optical substrate material, for example, lithium niobate, be pre-annealed to form a surface layer with a known congruent composition before diffusing the waveguide material into the substrate. It has been determined that the composition of optical substrates can vary from boule-to-boule, or even along the length of a given boule. These variations affect the diffusion rate of the waveguide material and result in varying mode sizes (both width and depth of the mode). By pre-annealing all material, the diffusion rate will remain relatively constant, regardless of the particular boule. The pre-annealing can be accomplished either by pre-equilibrating the lithium niobate in a vapor-phase equilibrating crucible containing pre-reacted lithium niobate cullet with the desired composition, or pre-equilibrating the lithium niobate to the Li$_2$O-rich phase boundary in a two-phase (LiNbO$_3$, Li$_3$NbO$_4$) powder bed.

9 Claims, 5 Drawing Sheets (Carruthers et. al)

PLOT OF Ti DIFFUSIVITY
AS A FUNCTION OF DEFECT CONCENTRATION

DEPENDENCE OF MODE DEPTH ON STRIP WIDTH

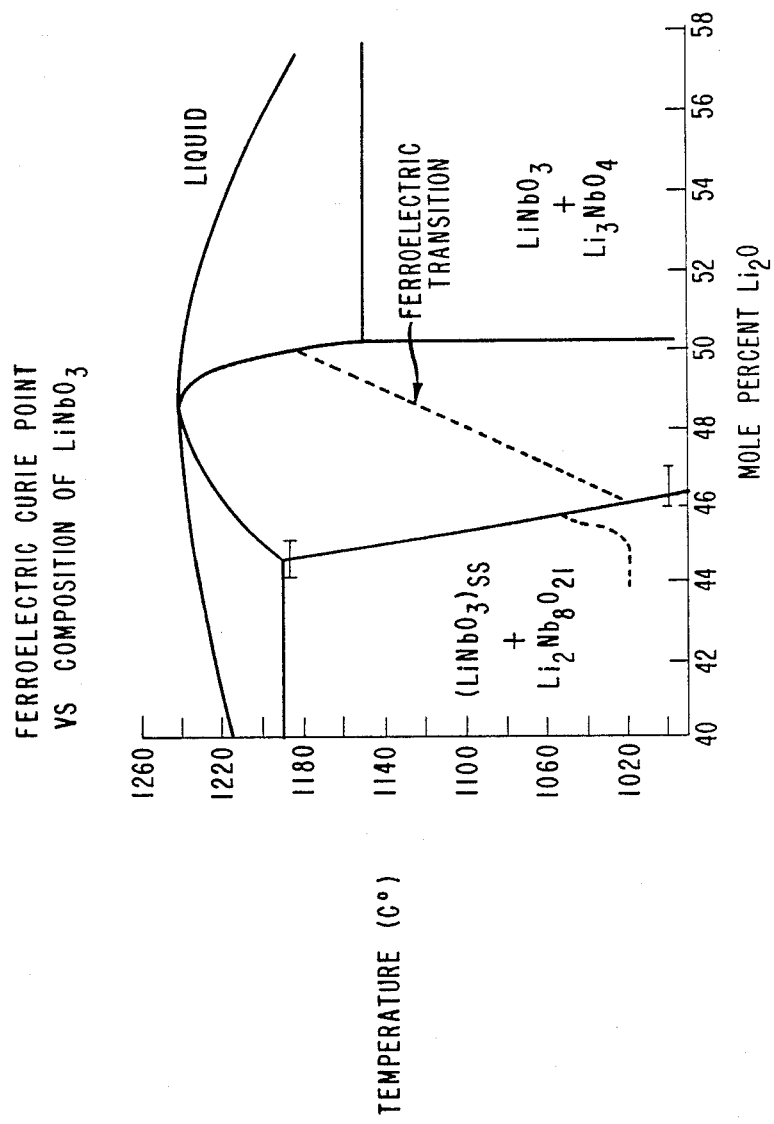

METHOD OF IMPROVING WAVEGUIDE UNIFORMITY IN OPTICAL SUBSTRATE AND PRODUCT

BACKGROUND OF THE INVENTION

1. Field of the Invention

The present invention relates to a method of improving the uniformity of waveguides formed in optical substrates and, more particularly, to a method wherein the optical substrate is pre-annealed to form a surface layer with a predetermined composition.

2. Description of the Prior Art

Integrated optical components formed on optical substrates are becoming increasingly prevalent in the field of lightwave communications and will become even more so in the future. These components most often utilize optical waveguides diffused into the substrate as part of the active device structure. In particular, optical waveguides usually comprise strips of titanium which are diffused into a lithium niobate optical substrate, although other materials may be used for both the waveguides and the substrate. The formation of this type of waveguide structure is disclosed in U.S. Pat. No. 4,284,663 issued to J. R. Carruthers et al on Aug. 18, 1981. As disclosed, a titanium waveguide is formed by selectively indiffusing metal ions into the crystal to effect an increase in the index of refraction of a surface portion of the crystal. The indiffused metal ions serve to raise one or both of the ordinary and extraordinary ($n_o$ and $n_e$) indices of the top layer of the substrate, whereby by properly adjusting the relevant diffusion parameters the waveguide characteristics of the surface may be controlled to provide the necessary guiding.

The diffusivity properties of titanium as related to lithium niobate have been studied in order to improve the operation of integrated optical components. One such study, entitled "Titanium diffusion into LiNbO$_3$ as a function of stoichiometry", by R. J. Holmes et al and appearing in the *Journal of Applied Physics*, Vol. 55, No. 10, May 1984 at p. 3531-5, involved the measurement of Ti diffusivity into LiNbO$_3$ as a function of crystal orientation (x,y or z-cut crystal) and Li/Nb ratio. The study concluded that enhanced lateral diffusion (control of which is necessary to obtain mode confinement) would result from forming an Li$_2$O outdiffused layer on top of the crystal. This would give, in effect, a depth dependent diffusion coefficient.

A limitation which currently exists in the formation of integrated optical devices is the difficulty of obtaining reproducible performance from like devices fabricated on different substrates. A major source of this difficulty relates to the boule-to-boule compositional variation in lithium niobate crystals, where it has also been shown that the crystal composition may vary along the length of a given boule. Thus, a need remains for a way of assuring that titanium diffusivity is independent of the particular optical substrate being employed.

SUMMARY OF THE INVENTION

The problem remaining in the prior art is addressed by the present invention which relates to a method of improving the uniformity of waveguides diffused into optical substrates and, more particularly, to a method wherein the optical substrate is pre-annealed to form a surface layer with a known congruent composition.

It is an aspect of the present invention to pre-anneal all lithium niobate crystal prior to device formation to form a surface layer with a known Li/Nb ratio, where this ratio guarantees that the diffusion rate of the waveguide material into the crystal will not vary from boule to boule. The surface layer must, of course, be uniform to a depth greater than the maximum depth of any indiffused waveguides.

In one embodiment of the present invention, lithium niobate crystal is pre-equilibrated in a vapor-phase equilibration (VPEq) crucible containing lithium niobate pre-reacted cullet of the congruent composition (as verified by chemical analysis) to form the desired Li/Nb ratio.

In an alternative embodiment of the present invention, lithium niobate crystal may be pre-equilibrated to the Li$_2$O-rich phase boundary in a two-phase power bed (the phases being LiNbO$_3$ and Li$_3$NbO$_4$) to form the desired Li/Nb ratio.

Other and further embodiments of the present invention will become apparent during the course of the following discussion and by reference to the accompanying drawings.

BRIEF DESCRIPTION OF THE DRAWINGS

Referring now to the drawings,

FIG. 5 is a graph illustrating the composition of lithium niobate as a function of temperature and mole percentage Li$_2$O.

DETAILED DESCRIPTION

Switches and modulators fabricated on lithium niobate substrates will be important components of lightwave telecommunications networks. A severe limitation to the introduction of lithium niobate technology into manufacture has been the difficulty of making devices fabricated on different substrates perform reproducibly. There are many reasons for this, some of which have been addressed by the prior art references cited above. A careful study of the defect chemistry of LiNbO$_3$ has now adduced a more serious cause, one arising from the the fundamental growth properties of the material itself. Ideally, crystals for device applications are cut from boules grown by the Czochralski method from a congruent melt at 48.45% mole Li$_2$O. However, it has been determined that variations in the composition and degree of homogeneity of incoming crystals cut from different boules can cause irreproducible optical properties.

Figure 1:
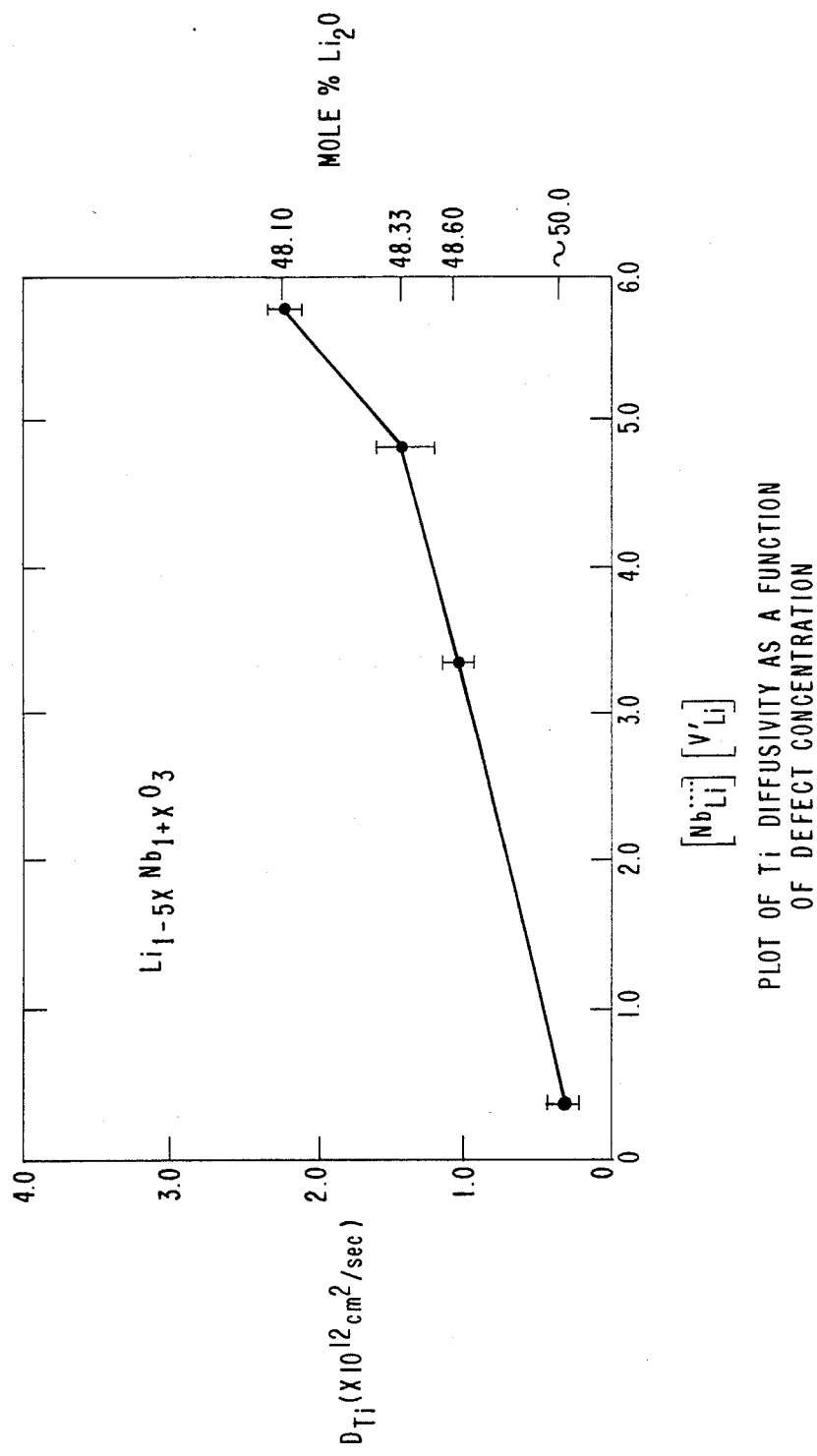
FIG. 1 is plot of titanium diffusivity as a function of defect concentration for varying mole percentages of Li$_2$O.
Figure 2:
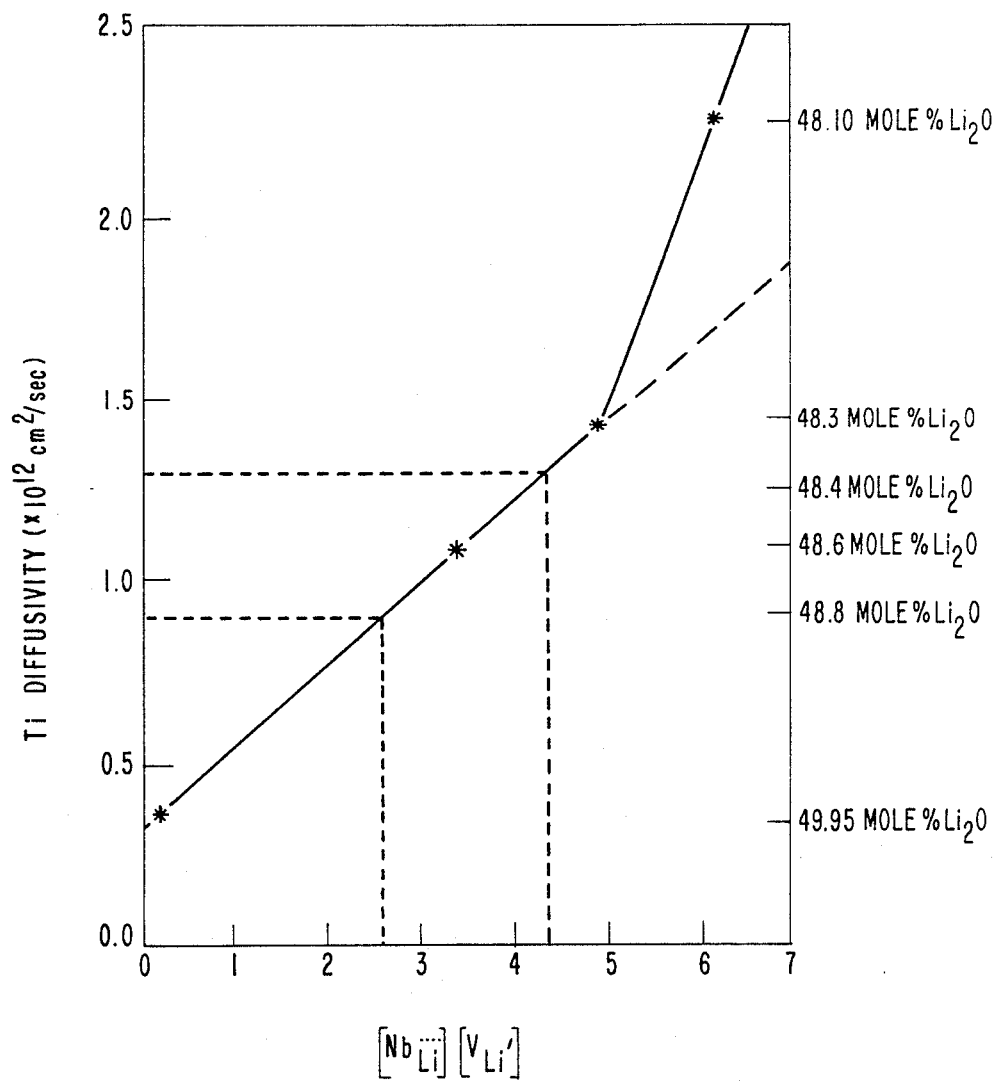
FIG. 2 is an enlarged portion of the plot of FIG. 1 for mole percentages of Li$_2$O in the range of 48.10% to 49.95%.

Titanium diffusion into lithium niobate is strongly related to the defect concentration of the lithium niobate crystal, represented by [Nb$_{Li}$...] [V'$_{Li}$]. FIG. 1 plots the titanium diffusitives as a function of the defect product. As predicted by earlier studies, the plot is linear from stoichiometric lithium niobate to compositions near 48.3 mole % Li$_2$O. At compositions with less than 48.3% Li$_2$O, the diffusivities increase dramatically due to complexation of defects within the material. Electro-optic devices are fabricated, as stated above, within the range of compositions around the congruently melting composition (48.45 mole % Li$_2$O). Referring to FIG. 1, this region is still on the linear portion of the curve. However, for as little as a 0.2 mole % change in the Li$_2$O content of a crystal, a change in titanium diffusivity (D$_{Ti}$) of up to 20% will result. This result is clearly illustrated in FIG. 2, which illustrates compositions of 48.40 mole % and 48.80 mole % Li$_2$O relative to a nominal composition of 48.60 mole % Li$_2$O.

Figure 3:
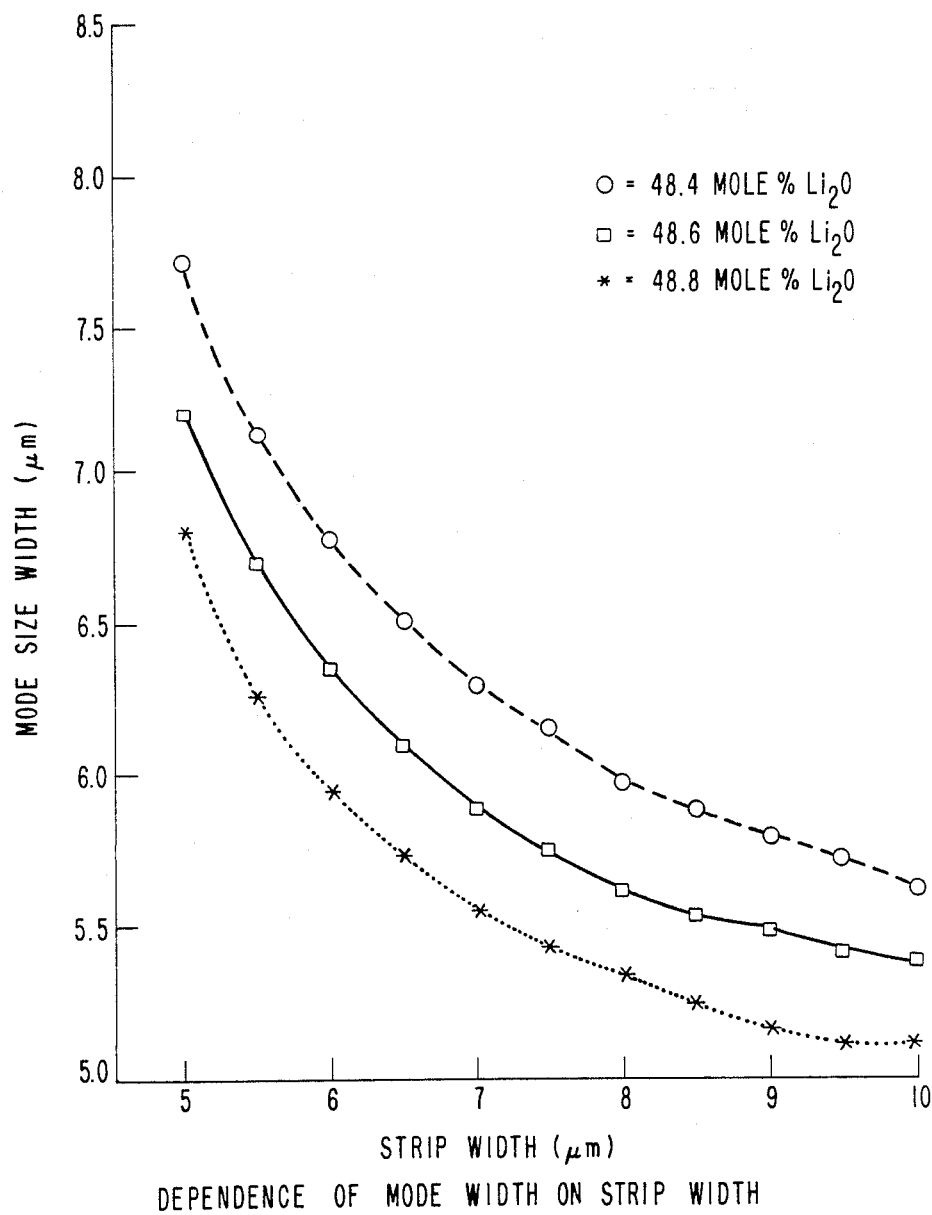
FIG. 3 is a plot illustrating the dependence of mode width on titanium strip width for different mole percentages of Li$_2$O in the substrate crystal.
Figure 4:
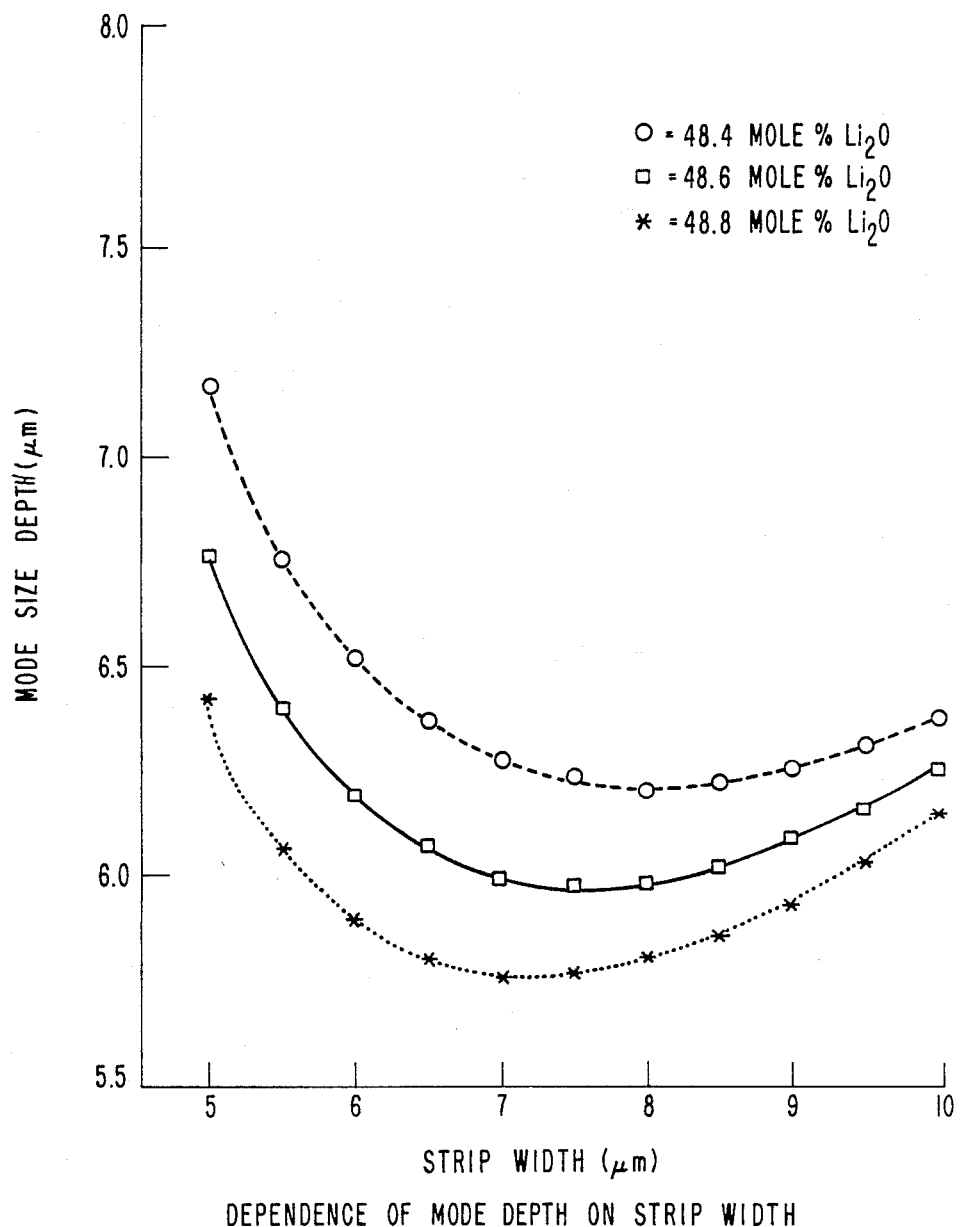
FIG. 4 is a plot illustrating the dependence of mode depth on titanium strip width for different mole percentages of Li$_2$O in the substrate crystal.

The corresponding change in optical mode size of an exemplary titanium diffused waveguide may be calculated from the changes in D$_{Ti}$ as a result of these compositional variations. For present purposes, this may be accomplished using a model program designed to calculate optical mode sizes in LiNbO$_3$ from waveguide fabrication parameters. The results are shown in FIGS. 3 and 4. These figures illustrate plots of mode size (TM polarization) as a function of strip width for three different compositions. Referring to FIG. 3, the optical mode width as a function of initial strip width is illustrated for the three compositions 48.4 mole %, 48.6 mole %, and 48.8 mole % Li$_2$O. These same compositions are utilized to form the graph of FIG. 4, which illustrates the dependence of mode depth on strip width for the various mole percentages of Li$_2$O. Reviewing both FIGS. 3 and 4, it is seen that even a 0.2 mole % change in composition can lead to a 0.5 μm change in the both the width and depth of the mode. These changes can result in significant performance variations for directional coupler type integrated optic switching devices presumably fabricated to provide identical performance. The difference in switching behavior arises from the difference in coupling between adjacent waveguides.

Studies have shown that compositional inhomogeneities of 0.02 mole % may be found along the length of boules grown from melts as close to the actual congruent composition as 48.60 mole % Li$_2$O. This inhomogeneity still represents a 2% change in D$_{Ti}$.

Therefore, since neither the compositional homogeneity nor the starting composition of lithium niobate crystals can be known with certainty prior to device fabrication, the pre-annealing technique of the present invention assures the uniformity of the crystals prior to device fabrication. In accordance with the present invention, this assurance may be provided in at least two different ways: (1) pre-equilibrate all incoming material in a vapor-phase equilibration (VPEq) crucible containing LiNbO$_3$ pre-reacted cullet (or crystal scrap) of analytically verified congruent composition, or (2) pre-equilibrate all incoming crystals to the Li$_2$O-rich phase boundary in a two-phase powder bed, the phases being LiNbO$_3$ and Li$_3$NbO$_4$.

The first method, although relatively easy in principle, has some inherent difficulties. In particular, the composition of the pre-reacted cullet must be monitored to insure that it still retains a sufficient amount of Li$_2$O. Once the cullet is depleted of Li$_2$O, the pre-annealing process must be halted and the cullet replaced.

EXAMPLE 1

The directional coupler device is a favored method for achieving optical switching in lithium niobate integrated optical substrates. The device, consisting of two matched waveguides in close proximity, functions by means of evanescent coupling from one waveguide to its neighbor by means of the tail of the propagating optical field distribution. The design of these devices is sensitive to subtle changes in the refractive index of the substrate and waveguide diffused regions through which it passes. As the refractive index and confinement of the mode are a strong function of the Li/Nb ratio and the diffusion properties of the waveguide dopant in the region of the waveguide, the manufacture of quantities of devices operating at the same operating voltages depends on the control of substrate composition across the substrate and from wafer to wafer.

A calibration pattern containing a number of directional couplers representing variations in several key design parameters was fabricated by standard photolithographic methods on a set of crystals cut from a large boule of material. Four crystals were used as-cut and polished while two were cut, polished, and pre-equilibrated in a crucible containing pre-reacted cullet of congruent composition, as verified by analytical methods. The pre-equilibration anneal was done at a temperature of 1050° C. for 100 hours. After titanium indiffusion at 1050° C. for 6 hours, the crystals were polished on the end faces and optically characterized at 1.3 and 1.5 μm. Of primary interest were the coupling lengths for comparable couplers on each crystal. It was found that the biggest differences between the two sets were in optical mode size and in coupling length, with the equilibrated pieces having noticeably less scatter in the results.

EXAMPLE 2

A set of crystals was cut from the same boule as in Example 1, polished, and pre-equilibrated to the lithium oxide-rich phase boundary at a temperature of 1100° C. for 500 hours. The lithium oxide-rich phase boundary corresponds very closely to the stoichiometric (e.g. Li/Nb=1.0) composition at this temperature. The same directional coupler pattern was fabricated on these pieces as was used in Example 1, and the same procedures used. The crystals were crucible diffused at 1050° C. for 6 hours, end faces polished, and optical mode size and coupling measurements made. The results demonstrated, for the first time, successful low insertion low waveguides in stoichiometric lithium niobate. Because the ferroelectric Curie temperature of lithium niobate increases linearly with lithium oxide content, waveguides can be fabricated in the stoichiometric material at higher temperatures and thus for shorter times than in congruent material (waveguides are normally fabricated at temperatures below the Curie temperature to preclude repoling to achieve single domain material). In addition, because of the low defect concentrations in stoichiometric crystals, reproducibility of device performance is more easily achieved (as demonstrated by transmission electron microscopy and x-ray diffraction studies as well as by optical measurements). The lower defect site concentrations also mean that potentially damaging low temperature crystallographic rearrangements are less likely to occur.

What is claimed is:

1. A method of forming optical waveguides in an optical substrate for providing improved diffusion uniformity of said optical waveguides, said method comprising the steps of:
   (a) providing an optical substrate consisting of LiNbO$_3$;

(b) pre-annealing said optical substrate provided in step (a) to form a surface layer with a predetermined congruent composition, said surface layer formed to comprise a depth at least equal to the depth of the optical waveguides; and (c) forming said optical waveguides in said congruent composition surface layer formed in step (b).

2. The method according to claim 1 wherein in performing step (b), the optical substrate is pre-equilibrated in a vapor-phase equilibration crucible containing pre-reacted optical substrate material of the predetermined congruent composition.

3. The method according to claim 1 wherein in performing step (a), the optical substrate material provided is lithium niobate having a congruent composition defined as 48.60 mole % $Li_2O$.

4. The method according to claim 3 wherein in performing step (b), the optical substrate material is pre-equilibrated to the $Li_2O$-rich phase boundary in a two-phase powder bed.

5. The method according to claim 4 wherein the two phases are $LiNbO_3$ and $Li_3NbO_4$.

6. The method according to claim 1 wherein in performing step (c), titanium-diffused optical waveguides are formed.

7. An optical device including optical waveguides formed in a surface layer having a predetermined congruent composition, said surface layer formed according to the method of claim 1.

8. The method according to claim 2, where in performing step (b) the pre-annealing is performed at a temperature of 1050° C. for approximately 100 hours.

9. The method according to claim 4, wherein in performing step (b) the pre-annealing is performed at a temperature of 1050° C. for approximately 500 hours.

* * * * *